United States Patent
Sasamoto et al.

(10) Patent No.: US 6,442,711 B1
(45) Date of Patent: Aug. 27, 2002

(54) SYSTEM AND METHOD FOR AVOIDING STORAGE FAILURES IN A STORAGE ARRAY SYSTEM

(75) Inventors: Kyouichi Sasamoto; Morishige Kinjo, both of Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/320,729

(22) Filed: May 27, 1999

(30) Foreign Application Priority Data

Jun. 2, 1998 (JP) ............................................. 10-153024

(51) Int. Cl.$^7$ ................................................. H02H 3/05
(52) U.S. Cl. .................................. 714/38; 714/5; 714/6; 714/7
(58) Field of Search ........................... 714/5, 6, 7, 47, 714/704, 708

(56) References Cited

U.S. PATENT DOCUMENTS 5,422,890 A * 6/1995 Klingsporn et al.
5,611,069 A * 3/1997 Matoba
5,717,850 A * 2/1998 Apperley et al.
5,727,144 A * 3/1998 Brady et al.

* cited by examiner

Primary Examiner—Robert Beausoleil
Assistant Examiner—Yolanda L. Wilson
(74) Attorney, Agent, or Firm—Finnegan, Henderson, Farabow, Garrett & Dunner, L.L.P.

(57) ABSTRACT

A higher reliable storage array system. A plurality of data storage devices store data; a spare storage device replaces one of the plurality of data storage devices; and a control unit controls an I/O operation of the plurality of data storage devices and the spare storage device. The control unit includes means for storing a history of self recovered errors of each one of the plurality of data storage devices, means for calculating an error rate of each of the plurality of data storage devices on the basis of the history of errors, means for judging a necessity to execute a preventive maintenance of each one of the plurality of data storage devices from the error rate, and means for executing the preventive maintenance. The storage array system judges if each of the plurality of data storage devices is in need of exchange or not at intervals of predetermined access size, from the error rate and an inclination of two error rates of adjacent intervals in addition to a total number of errors of the plurality of data storage devices. Furthermore, the storage array system reuses the data storage device judged to be in need of exchange for the time being. Accordingly, the storage array system can avoid disk failures leading to a data loss.

21 Claims, 8 Drawing Sheets

| DISK DRIVE NUMBER ( = 0 ) | DISK DRIVE NUMBER ( = 1 ) | ................ |
|---|---|---|
| TOTAL ACCESS SIZE | TOTAL ACCESS SIZE | ................ |
| TOTAL NUMBER OF ERRORS | TOTAL NUMBER OF ERRORS | ................ |
| TOTAL ACCESS SIZE WHEN ERROR-0-1 IS DETECTED | TOTAL ACCESS SIZE WHEN ERROR-1-1 IS DETECTED | ................ |
| TOTAL ACCESS SIZE WHEN ERROR-0-2 IS DETECTED | TOTAL ACCESS SIZE WHEN ERROR-1-2 IS DETECTED | ................ |
| TOTAL ACCESS SIZE WHEN ERROR-0-3 IS DETECTED | TOTAL ACCESS SIZE WHEN ERROR-1-3 IS DETECTED | ................ |
| ⋮ | ⋮ | ⋮ |
| THRESHOLD VALUE OF TOTAL NUMBER OF ERRORS | THRESHOLD VALUE OF TOTAL NUMBER ERRORS | ................ |
| THRESHOLD VALUE OF ERROR RATE | THRESHOLD VALUE OF ERROR RATE | ................ |
| THRESHOLD VALUE OF INCLINATION OF ERROR RATE | THRESHOLD VALUE OF INCLINATION OF ERROR RATE | ................ |

SYSTEM AND METHOD FOR AVOIDING STORAGE FAILURES IN A STORAGE ARRAY SYSTEM

FIELD OF THE INVENTION

This invention relates to storage systems and more particularly relates to a system and method for executing preventive maintenance of storage array systems.

BACKGROUND OF THE INVENTION

Redundant Arrays of Independent Disks (RAID) store large amounts of user data into a collection of disks. There are a plurality of levels of the RAID, such as levels 0 to 5, having different characteristics of reliability, data availability, and cost performance.

In terms of reliability, the RAID protects the user data against loss or inaccessibility due to disk failures. Part of the RAID's physical storage capacity is used to store redundant or back-up data about the user data stored on the remainder of the physical storage capacity. The redundant data enables regeneration of the user data in the event that one of the array's member disks or the access path to it fails.

For example, a RAID system of level 4 (hereinafter, referred to as "RAID 4") usually includes a plurality of data disks for storing user data received from a host computer, a parity disk for storing parity data, and. a spare disk for replacing one of the other disks if it fails. In RAID 4, the user data is divided into a plurality of data blocks having a predetermined sequential address and a predetermined size. RAID 4 creates a parity block by carrying out exclusive OR (XOR) operations with a set of corresponding data blocks sequentially addressed on different data disks. The set of corresponding data blocks and the parity block make a "parity group". Furthermore, the plurality of data blocks and the parity block are respectively distributed into the plurality of data disks and the parity disk in predetermined order.

In the event that one of the plurality of data disks or the parity disk fails completely and data on it becomes entirely unusable, RAID 4 regenerates a data block or a parity block of the failed disk using the remaining data blocks in the corresponding parity group and stores the regenerated data on the spare disk. This operation is referred to as "Hot Spare Operation".

The Hot Spare Operation usually fulfills its function when an actual disk failure occurs. However it is also applicable to an exchange of disks in a preventive maintenance routine of the RAID as well as a recovery from an actual failure. When it is applied to the preventive maintenance routine, the RAID detects and counts the total number of errors of every disk. In the event that the total number of errors exceeds a predetermined value ("threshold value"), the RAID system alarms a necessity for exchanging the particular disk as a failed one to a new disk or automatically executes the Hot Spare Operation.

However, the RAID system judges when to execute the preventive maintenance only from the total number of errors specified as a maximum number of errors. Consequently, the RAID can not distinguish clearly an occasion when the errors are occurring at a normal error rate from an occasion when the errors are occurring at an abnormal error rate which requires preventive maintenance. There is some possibility that the RAID can not recognize a symptom of a fatal failure.

Furthermore, after executing the Hot Spare Operation, the RAID generally disconnects the failed disk from the system.

Consequently, the RAID has no tolerance for recovering another disk failure until a new spare disk is attached. If another failure occurs before the attaching, that failure causes an irretrievable data loss.

SUMMARY OF THE INVENTION

Accordingly, it is an object of the present invention to provide a system and method for executing preventive maintenance of the conventional storage array system to achieve higher reliability.

A storage array system, consistent with the present invention, comprises a plurality of data storage devices for storing data and a control unit for controlling input and/or output operations of the plurality of data storage devices. The control unit includes means for storing a history of self recovered errors for each of the plurality of data storage devices, means for calculating an error rate of each of the plurality of data storage devices on the basis of the history of errors, and means for judging a reliability of operation of each of the plurality of data storage devices from the error rate.

A storage array system, consistent with the present invention, comprises a plurality of data storage devices for storing data, a spare storage device for replacing one of the plurality of data storage devices, and a control unit for controlling input and/or output operations of the plurality of data storage devices and the spare storage device. The control unit includes means for storing a history of self recovered errors for each of the plurality of data storage devices, means for calculating an error rate of each of the plurality of data storage devices on the basis of the history of errors, means for judging a necessity to execute preventive maintenance of each of the plurality of data storage devices from the error rate, and means for executing the preventive maintenance.

BRIEF DESCRIPTION OF THE DRAWINGS

A more complete appreciation of the present invention and many of the attendant advantages thereof will be readily obtained as the same becomes better understood by reference to the following detailed description, when considered in connection with the accompanying drawings, wherein.

DETAILED DESCRIPTION OF THE INVENTION

According to an embodiment of the present invention, the storage array system judges if each storage device is in need of exchange or not at intervals of predetermined access size, from an error rate and an inclination of two error rates of adjacent intervals in addition to a total number of errors, so as to avoid disk failures leading to data loss.

Figure 1:
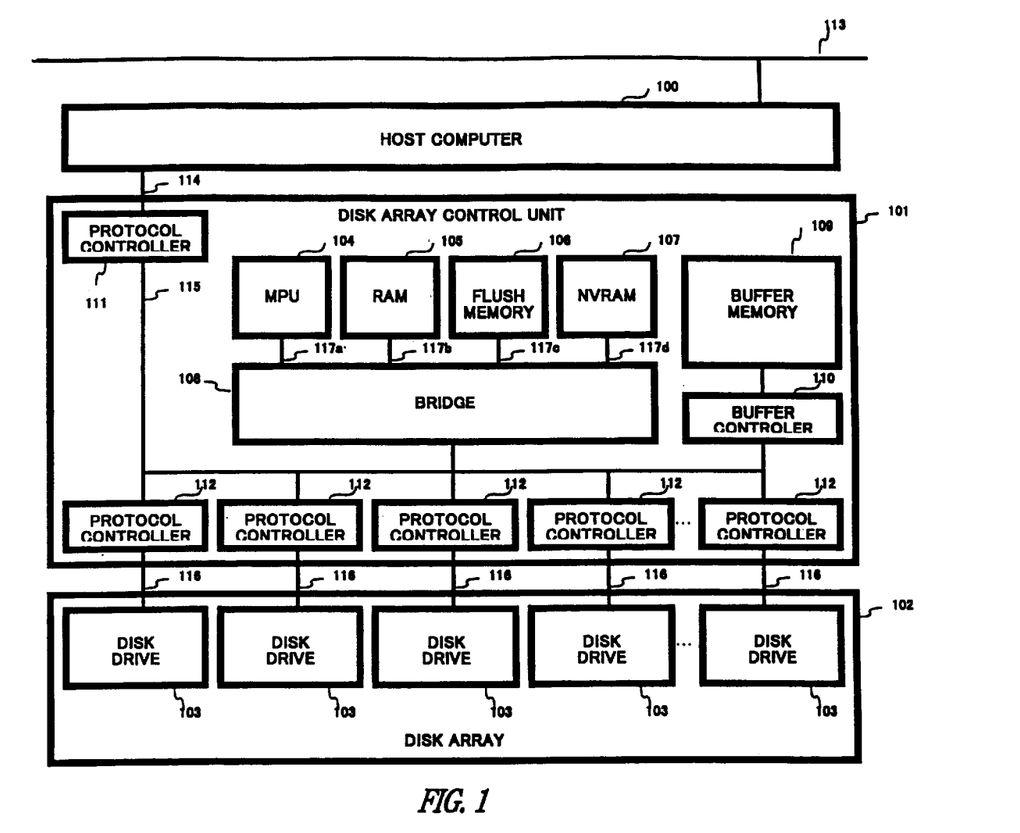
FIG. 1 is a diagram for illustrating hardware structure of an embodiment of a disk array system according to the present invention.

FIG. 1 is a diagram for illustrating hardware structure of an embodiment of a disk array system according to the present invention.

In FIG. 1, a user computer (this is not shown in FIG. 1) is connected via a communication line 113 to a host computer 100 which executes an application program in response to a request from the user computer. The host computer 100 is connected to a RAID based disk array control unit 101, to put it more precisely, to a protocol controller 111 in it via a data bus 114 such as a SCSI (Small Computer System Interface) standardized.

The disk array system includes a disk array control unit 101 and a disk array 102. The disk array control unit 101 has a plurality of protocol controllers 112. The disk array 102 has a plurality of disk drives 103 and stores user data in a RAID manner. A protocol controller 112 and a disk drive 103 are connected in one to one correspondence via a data bus 116 such as a SCSI standardized.

The disk array control unit 101 includes a MPU 104, a RAM 105, a flush memory 106, and a non-volatile memory (NVRAM) 107, each one of them is connected to a bridge 108 via an internal bus 117 indigenous to the MPU 104. The MPU 104 executes all-round processes in the disk array system. The RAM 105 provides work space. The flush memory 106 stores codes and variables for operations. The NVRAM 107 stores after-mentioned error histories of every disk drive 103, threshold values of the total number of errors, the error rate, and its inclination. The bridge 108 is a bus protocol conversion circuit which provides an interface between an internal bus 117 and the data bus 115, such as a PCI (Peripheral Component Interconnect) standardized.

The disk array control unit 101 also includes a buffer memory 109 and a buffer controller 110. The buffer memory 109 temporarily stores user data which is transferred between the host computer 100 and the disk array 102. The buffer controller 110 primarily performs three functions, namely, (1) to manage an Input/Output (I/O) operation of the buffer memory 109, (2) to create parity data and (3) to execute a prescribed operation for regenerating lost user data by using the parity data (however, it is not necessary to get these functions together). The buffer controller 110, the bridge 108, the protocol controller 111 and every protocol controller 112 are connected via the data bus 115 to each other.

Figure 2:
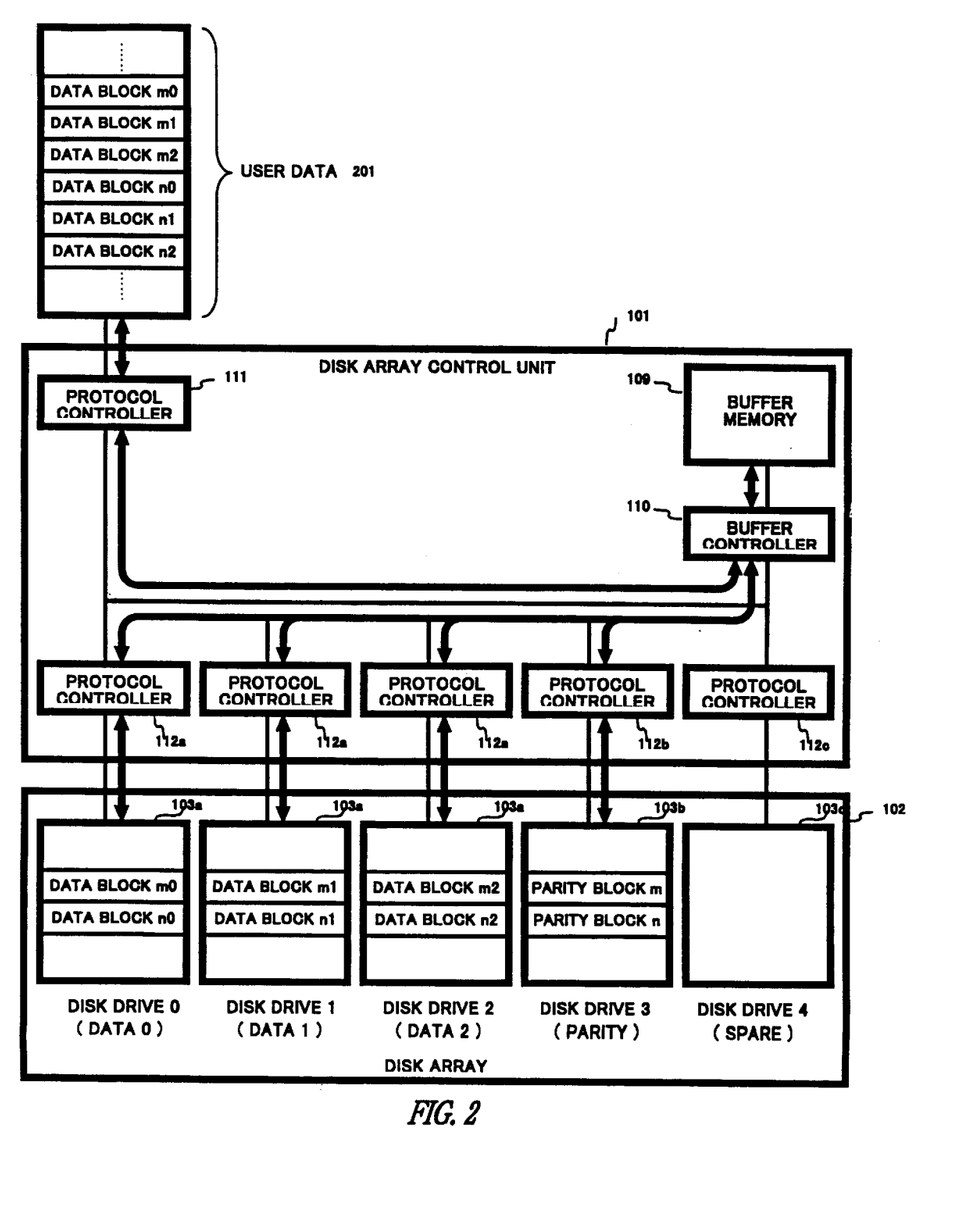
FIG. 2 is a diagram for illustrating how to store user data on RAID 4, consistent with the present invention.

FIG. 2 is a diagram illustrating how to store user data on RAID 4, consistent with the present invention.

In FIG. 2, the disk array 102 is composed of five disk drives. Namely, three disk drives 103a for storing user data (disk drives 0–2), one disk drive 103b for storing parity data (disk drive 3) and one disk drive 103c as a potential replacement of the other disk drives (disk drive 4). User data 201 includes data blocks m0, m1, m2, n0, n1, n2 for convenience's sake (actually, the user data 201 is not divided like this at this stage). The following explains procedures controlled by the MPU 104 in response to a read/write request from the host computer 100.

When the host computer 100 requests to write the user data to the disk array 102, first, the user data is temporarily stored in a secured area in the buffer memory 109 via the protocol controller 111. Secondly, the data is divided into a plurality of data blocks having a sequential address and a predetermined size such as "m0, m1, m2, n0, n0, n2".

Thirdly, the buffer controller 110 creates a parity block, such as "m", from the corresponding data blocks such as data block m0, m1, m2, by exclusive OR (XOR) operations as follows. Finally, the data blocks are obtained by each disk drive 103a in due order via each protocol controller 112a and the parity block is obtained by the parity disk drive 103b via the protocol controller 112b.

(parity block $m$)=(data block $m0$) XOR (data block $m1$) XOR (data block $m2$)

On the other hand, when the host computer 100 requests to read the user data stored on the disk array 102, every corresponding data block is transmitted in due order to a secured area in the buffer memory 109 and temporarily stored on the area in the original form of the user data. In the event that one of the disk drives 103a fails, the buffer controller 110 regenerates data blocks stored on the failed disk drive by XOR operations of the parity block and the remaining data blocks in the same parity group stored on the other disk drives. Subsequently, the user data is transmitted to the host computer 100.

Figure 3:
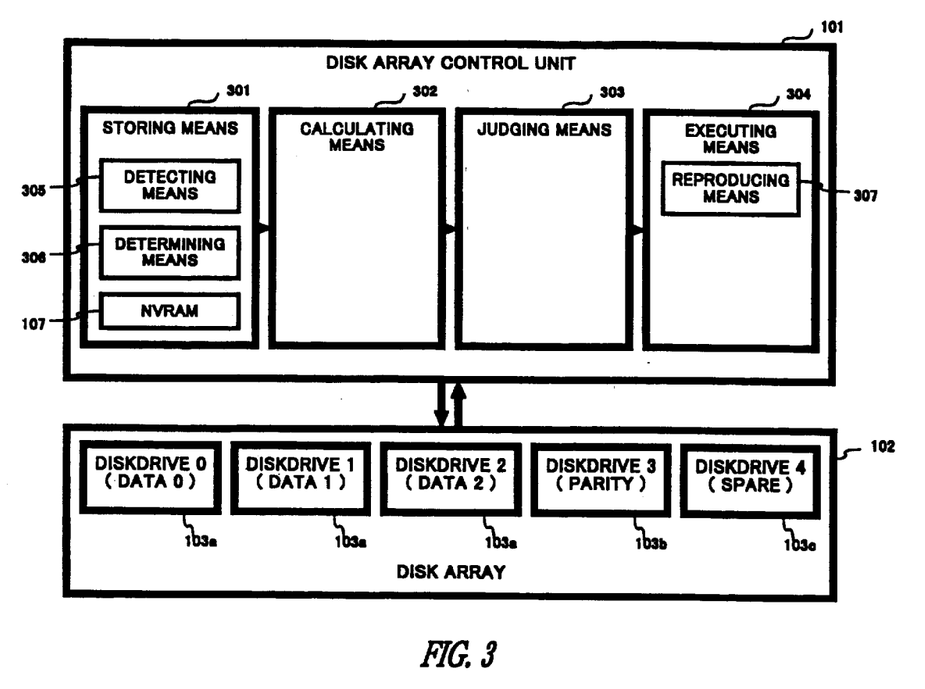
FIG. 3 is a RAID 4 based functional block diagram of the embodiment of FIG. 1.

FIG. 3 is a RAID 4 based functional block diagram of the embodiment of FIG. 1.

In FIG. 3, the disk array control unit 101 comprises four means mainly implemented by the MPU 104, such as a storing means 301, a calculating means 302, a judging means 303, and executing means 304. Furthermore, the storing means 301 comprises a detecting means 305, a determining means 306, and NVRAM 107, and the executing means 304 comprises a reproducing means 307.

Figure 4:
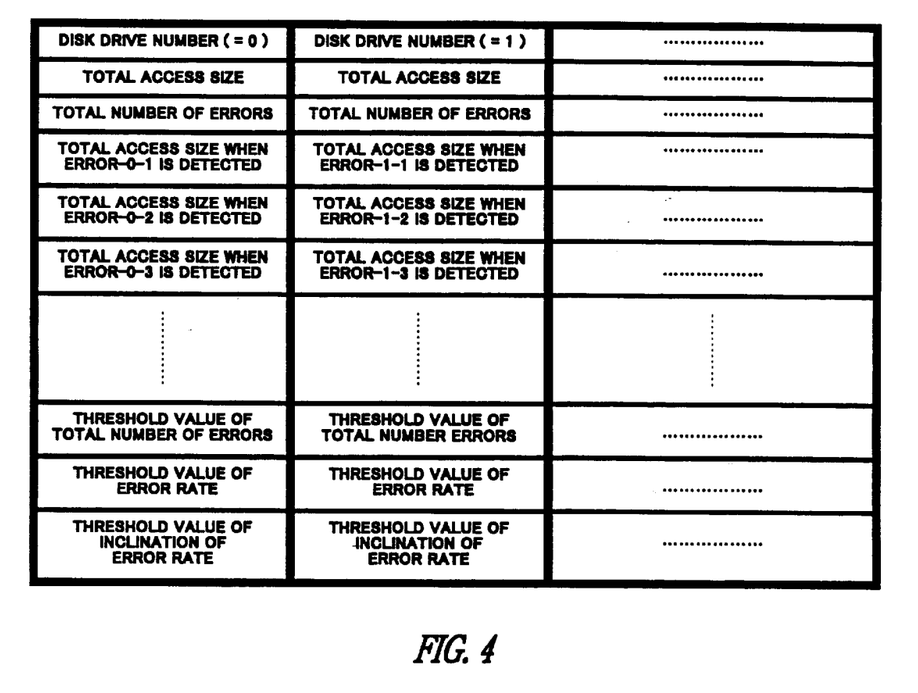
FIG. 4 shows a table of error histories of disks located in the NVRAM.

FIG. 4 shows a table of error histories of every disk located in the NVRAM;

Before a user accesses the disk array system, several threshold values, such as the total number of errors, error rate, and the error rate inclination, are set by the user in the table. (Although the threshold values are set for each disk drive in the FIG. 4, it is possible to set them in common.) When, the user wants to change the values, a new one should be input to update the table.

Whenever the MPU 104 commands each corresponding disk drive to operate Read/Write instruction, each corresponding disk drive reports to the MPU 104 on its driving condition. If a disk drive reports that it overcame some errors by itself in the course of the Read/Write operation, the MPU 104 counts up the number of errors of the disk drive and calculates some other values, such as "total access size", "total number of errors" and "total access size when an error is detected", and stores them in the table. These errors are recoverable by the retrying function and the data correcting function of the disk drive, for example. The total access size means the total amount of access bytes since its begging in use until now. When a disk drive is written 4 K bytes and read 16 K bytes, the total access size is 20 K bytes (20=4+16) altogether, for example.

Figure 5:
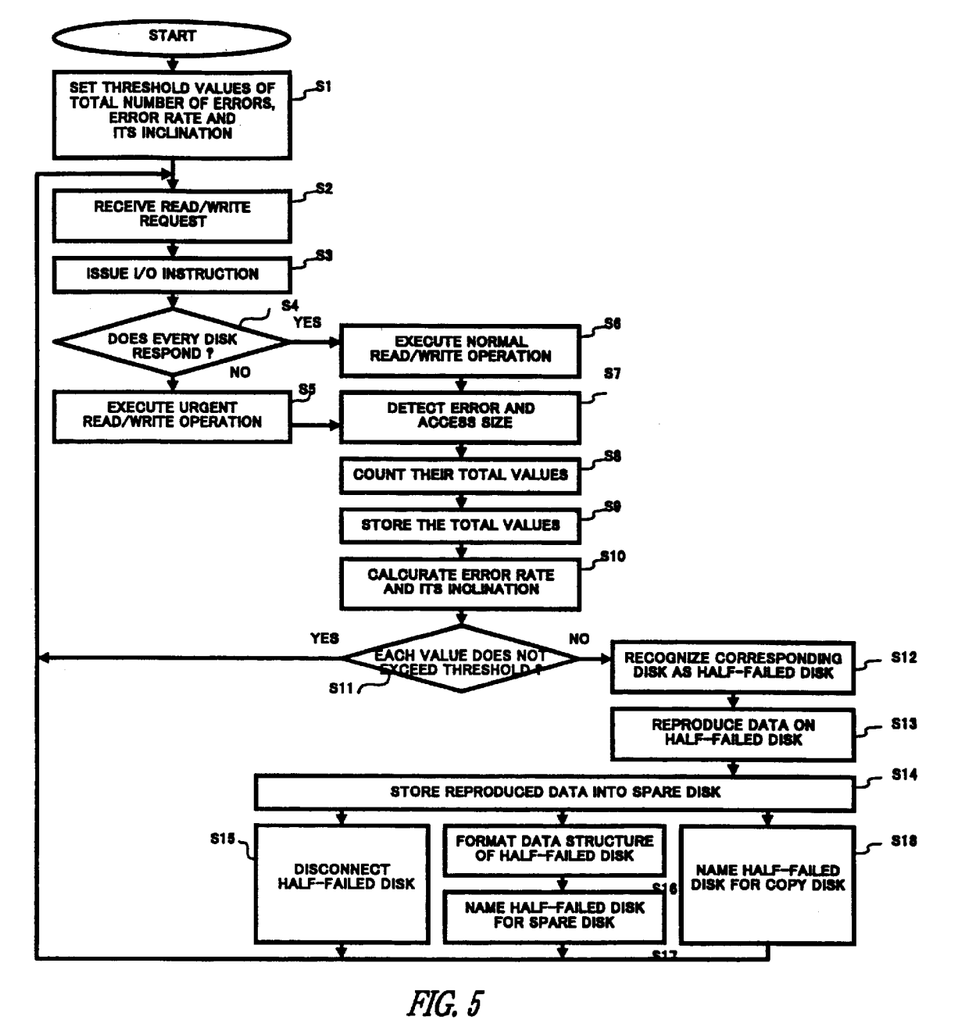
FIG. 5 is a flowchart illustrating a preventive maintenance procedure in the disk array system of FIG. 3.

FIG. 5 is a flowchart showing a preventive maintenance procedure in the disk array system of FIG. 3.

Before a user accesses the disk array system, the threshold: values are set by the user (see step S1). The disk array control unit 101 waits for a Read/Write request from the host computer 100. If the disk array control unit 101 receives some request (see step S2), it issues an I/O instruction to the disk array 102 (see step S3).

After issuing the I/O instruction, the disk array control unit 101 observes the response of each disk drive 103a.

In the event that a disk drive 103a does not respond within an expected response time (see step S4), the disk array control unit 101 executes an urgent Read/Write operation.

Namely, in the case of a Read request, first, the disk array control unit 101 regenerates the user data on the disk drive 103a which made no response. Secondly, the disk array control unit 101 stores temporally the data into the secured area in the buffer memory 109 with other corresponding user data. Thirdly, the disk array control unit 101 sends the regenerated user data to the host computer 100. Subsequently, the disk array control unit 101 disconnects the failed disk drive and informs the host computer to that effect. On the other hand, in the case of a Write request, first, the disk array control unit 101 disconnects the failed disk drive. Secondly, the disk array control unit 101 informs the host computer 100 to that effect. Thirdly, the disk array control unit 101 distributes the user data onto the remaining disk drives 103a (see step S5).

If every disk drive 103a responds within an expected response time (see step S4), the disk array control unit 101 executes a normal Read/Write operation. Namely, in the case of a Read request, the disk array control unit 101 stores the corresponding data which was read from the corresponding disk drives 103a into the secured area and sends the read data to the host computer 100. On the other hand, in the case of a Write request, the disk array control unit 101 stores the user data temporarily into the secured area and writes the data into the disk drives 103a in a prescribed data block form (see step S6).

Shortly after executing either the normal Read/Write operation or the urgent Read/Write operation, the detecting means 305 checks an I/O status of each disk drive. If the status indicates that the disk drive overcame some recoverable errors on disk driving, the detecting means 305 recognizes it as an error, and also detects an access size of the disk drive 103a (see step S7). Subsequently, the determining means 306 counts up a total number of the errors and a total access sizes of the disk drive (see step 58), and stores them into the NVRAM 107 (see step S9).

The calculating means 302 calculates an error rate and its inclination value from the total number of errors and the total access size of the disk drive in a way described later in FIG. 6 (see step S10). The judging means 303 judges if the disk drive is in need of disk changes from the total number of errors, the error rate, and the error rate inclination. When none of the calculated values exceeds the threshold value specified in the system, the disk array control unit 101 waits for further Read/Write requests from the host computer 100. If at least one of the calculated values exceeds the threshold value (however there may be some other combinations of the them, see step S11). The executing means 304 regards the disk drive as half-failed (see step 12). The reproducing means 307 copies or regenerates the data on the half-failed disk drive (see step S13), and stores the reproduced data on the spare disk drive 103c (see step S14). Furthermore, the executing means 304 (1) disconnects the half-failed disk drive 103a from the disk array system (see step S15), (2) formats the data structure of the half-failed disk drive 103a (see step S16) and names the half-failed disk drive 103a as a new spare disk drive (see step S17), or (3) names the half-failed disk drive 103a as a copy disk drive of the spare disk drive 103c (see step S18). Then the disk array control unit 101 waits for further Read/Write requests from the host computer 100.

Figure 6A:
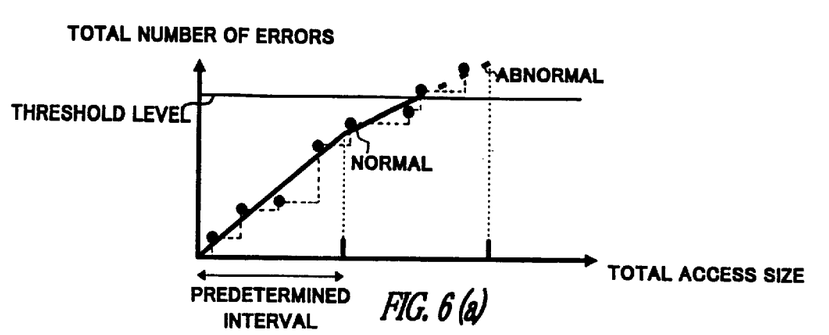
FIGS. 6(a), 6(b), and 6(c) are diagrams illustrating how to calculate the error rate and its inclination shown in step S10 of FIG. 5.
Figure 6B:
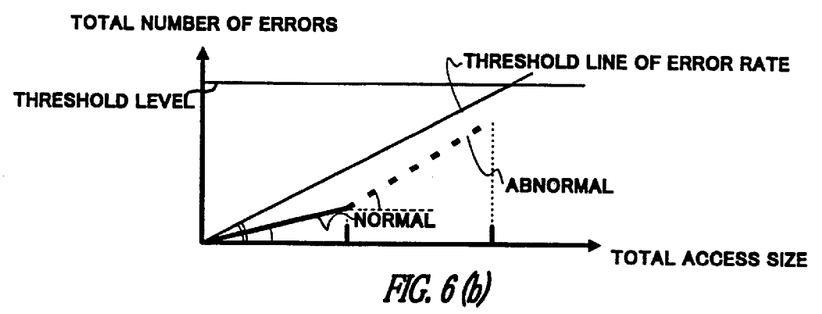
Figure 6C:
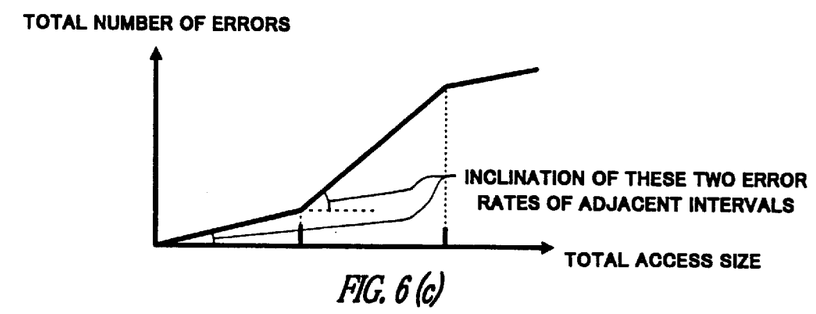

FIGS. 6(a), 6(b), and 6(c) are diagrams illustrating how to calculate the error rate and its inclination shown in step S10 of FIG. 5. In each of FIGS. 6(a), 6(b), and 6(c), the vertical axis shows the total number of errors and the horizontal axis shows the total access size.

In FIG. 6(a), a total number of errors is marked with a dot against a total access size when an error is detected. A line segment is drawn as an approximate line segment of the dots in each predetermined interval. The line segment shows a normal transition at the beginning and then exceeds the threshold level in the middle of the second interval. Subsequently, the judging means 303 judges that the disk drive needs to be exchanged. If the judging means 303 judges the necessity of preventive maintenance from an error rate and its inclination in addition to the total number of errors, the threshold level can be set up with a more appropriate value which is higher than a conventional level.

In FIG. 6(b), the first line segment shows a normal transition and the second line segment shows an abnormal transition because a necessity of preventive maintenance is judged by comparing each inclination angle of the line segment and the drawn threshold line of error rate.

In FIG. 6(c), the judging means 303 can judge the necessity of preventive maintenance more sharply using a value of an inclination of two error rates of adjacent intervals in addition to the total number of errors and the error rate. Even if the second line segment does not exceed the threshold level, the judging means 303 can eligibly judge it abnormal.

Figure 7:
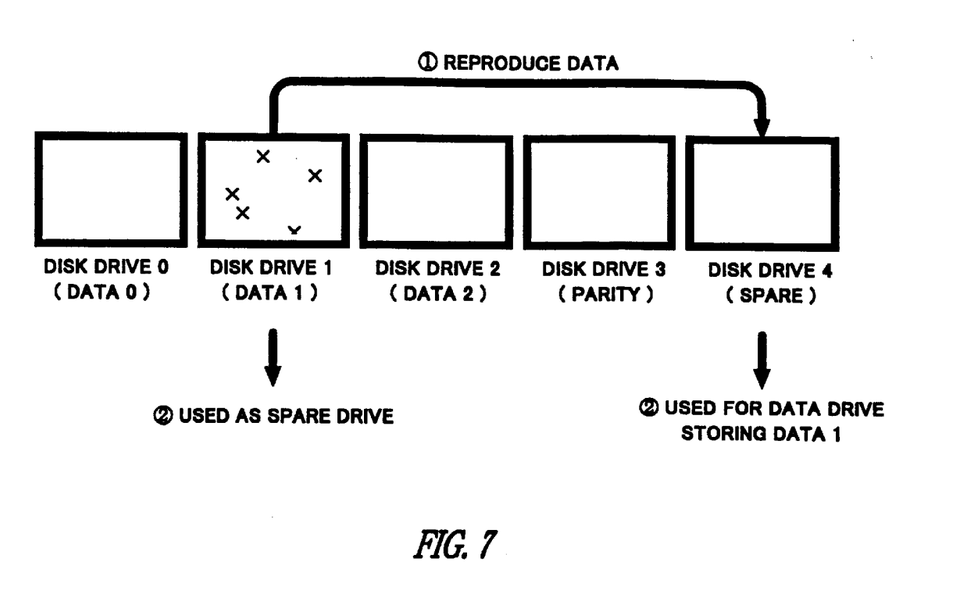
FIG. 7 is a diagram illustrating the step S17 of FIG. 5.

FIG. 7 is a diagram illustrating the step S17 of FIG. 5.

In case that the judging means 303 concludes that the preventive maintenance is needed for some disk drive (provisionally, the disk drive 1), the disk array control unit 101 disconnects logically the half-failed disk drive 1 from the disk array system in general as shown the step S15 of FIG. 5. However, in most cases, the half-failed disk drive may still store data for the time being. Namely, even after judged to be in need of exchange and substituted by a spare disk drive (the disk drive 4) as a disk drive storing a data 1, the disk drive 1 can act as a new spare drive. Therefore, the executing means names the half-failed disk drive a new spare disk drive in the system.

Figure 8:
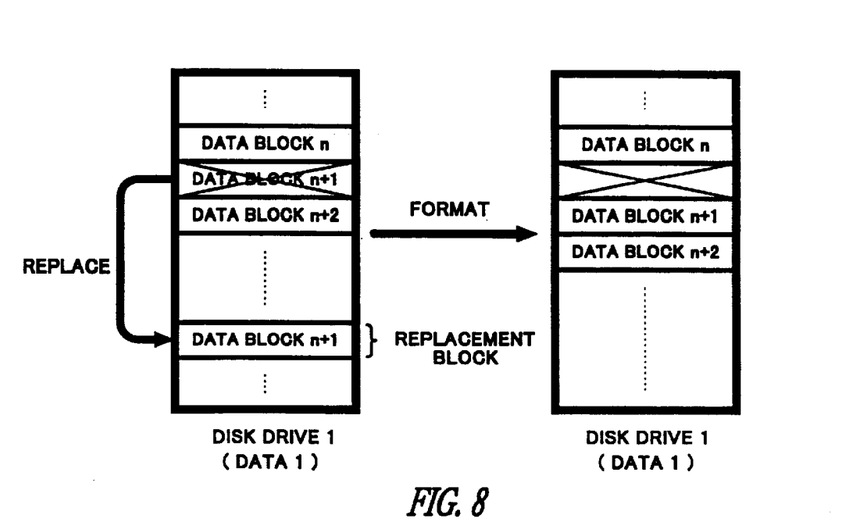
FIG. 8 is a diagram illustrating the step S16 of FIG. 5.

FIG. 8 is a diagram illustrating the step S16 of FIG. 5.

Disks may develop minor errors, such as a media defect, that leaves the disk as a whole usable but causes data loss over a small area. Many disks protect against these errors by reserving replacement blocks. When an error is discovered, each disk substitutes a block of this space for the defective one. However, the replacement blocks are located discontinuously to the original data location. After many replacements are executed, sequential data blocks composing one data are stream stored on many discontinuous spaces across the disk drive. This reduces the performance of the disk array system because many seeking movements are needed. Therefore, before the disk array system uses the half-failed disk drive as a spare one, the half-failed disk drive should be wholly formatted.

Figure 9:
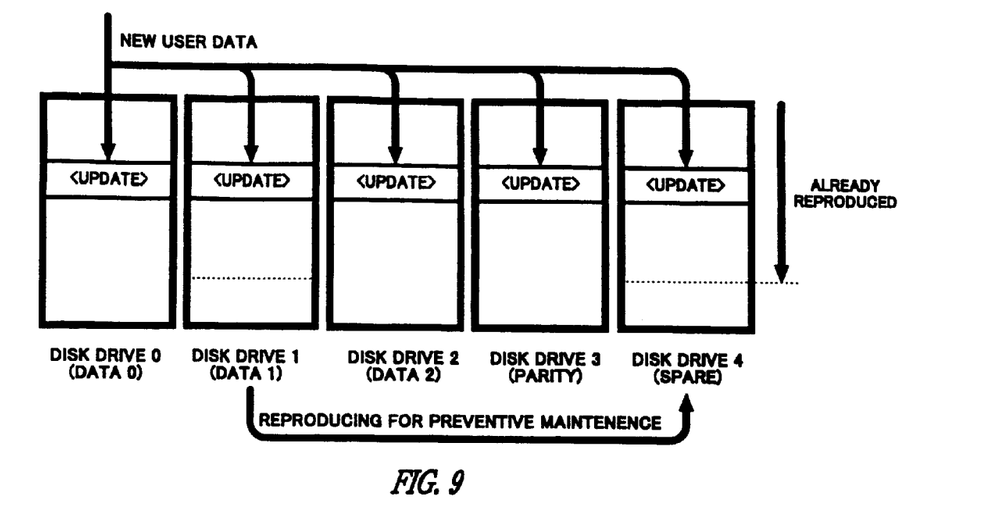
FIG. 9 is a diagram illustrating the step S18 of FIG. 5.

FIG. 9 is a diagram illustrating the step S18 of FIG. 5.

As described above, even after judged to be in need of exchange and substituted by the disk drive 4 as a disk drive storing a data 1, the disk drive 1 can act as a copy disk drive of the disk drive 4. The executing means 303 regards the disk drive 4 as a main disk drive and the disk drive 1 as a sub disk drive. When the host computer 100 requests to write data during the reproducing the data for the preventive maintenance, the disk array control unit 101 evenly updates both of the disk drive 1 and the disk drive 4 as long as the data is stored in an area which is already reproduced.

Figure 10:
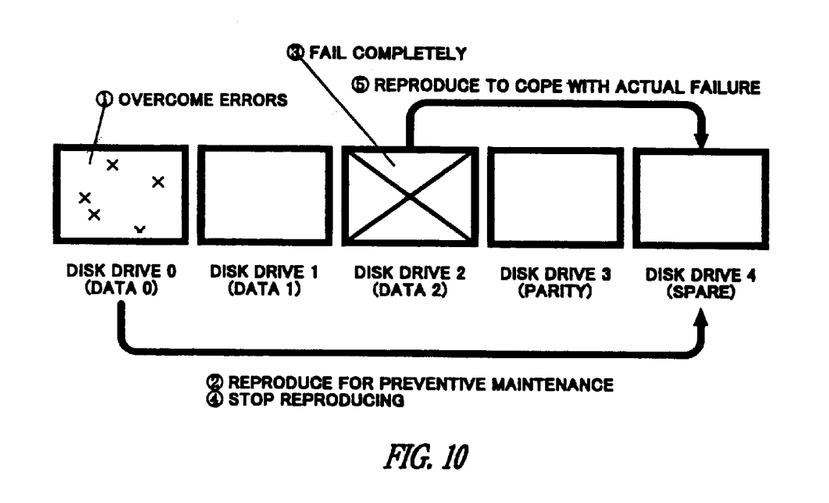
FIG. 10 is a diagram illustrating a procedure of protecting data stored on a third disk while using the half-failed disk drive shown in FIG. 9.

FIG. 10 is a diagram illustrating a procedure of protecting data stored on a third disk data during the using of the half-failed disk drive shown in FIG. 9.

In the event that an actual disk failure happens in the middle of the using of the half-failed disk drive, the disk array system stops the reproducing and starts reproducing data of the actual failed disk drive on the spare disk drive.

The disk array system of the present invention observes a trend of occurrence of self-recoverable disk errors for each disk drive, judges the necessity of disk exchanges, and stores the data stored on the disk drive judged to be half-failed onto a spare disk drive before a fatal failures occurs. Accordingly, the disk array system can avoid a data loss due to disk failures effectively and an unnecessary physical disconnection of disk drives, and improves the reliability of the system.

The present invention is explained with a RAID 4 system. However, the present invention is also applicable to RAID 1, RAID 3, RAID 5 because each of them has a parity data disk drive (it is a copy data disk drive in the RAID 1 that is responds to the parity data disk drive in other RAIDs).

Numerous modifications and variations of the present invention are possible in light of the above teachings. It is therefor to be understood that, within the appended claims, the present invention can be practiced in a manner other than as specifically described herein.

What is claimed is:

1. A storage array system, comprising:
    a plurality of data storage devices for storing data; and
    a control unit for controlling input and/or output operations of the plurality of data storage devices;
    wherein the control unit includes:
        means for storing a history of self recovered errors for each of the plurality of data storage devices;
        means for calculating an error rate for a specified interval of each of the plurality of data storage devices based on the history of errors; and
        means for judging a reliability of operation of each of the plurality of data storage devices from the error rate for the specified interval.

2. The storage array system of claim 1, wherein the storing means includes:
    means for detecting a number of errors and an access size of each one of the plurality of data storage devices respectively as part of the history of errors for each input and/or output operation.

3. The storage array system of claim 2, wherein:
    the storing means further includes,
        means for determining a total number of errors, a total access size, and an access size when each error is detected, for each of the plurality of data storage devices, and
        a non-volatile memory for storing, for each of the plurality of data storage devices, the total number of errors, the total access size and the access size when each error is detected; and
    wherein the calculating means calculates the error rate at intervals of predetermined access size from the total number of errors, the total access size, and the access size when each error is detected.

4. The storage array system of claim 3, wherein:
    the non-volatile memory further stores a threshold value of error rate; and
    the judging means judges the reliability of operation of each of the plurality of data storage devices by comparing the calculated error rate and the threshold value of error rate.

5. The storage array system of claim 3, wherein:
    the calculating means further calculates two inclinations of two error rates of adjacent intervals;
    the non-volatile memory further stores a threshold value of inclination of two error rates of adjacent intervals; and
    the judging mean judges the reliability of operation of each of the plurality of data storage devices from the threshold value and the inclinations.

6. A storage array system, comprising:
    a plurality of data storage devices for storing data;
    a spare storage device for replacing one of the plurality of data storage devices; and
    a control unit for controlling input and/or output operations of the plurality of data storage devices and the spare storage device;
    wherein the control unit includes:
        means for storing a history of self recovered errors for each of the plurality of data storage devices;
        means for calculating an error rate for a specified interval for each of the plurality of data storage devices based on the history of errors;
        means for judging a necessity to execute preventive maintenance of each of the plurality of data storage devices from the error rate for the specified interval; and
        means for executing the preventive maintenance.

7. The storage array system of claim 6, further comprising:
    reproducing means for reproducing data from one of the plurality of data storage devices judged to be in need of the preventive maintenance on the spare storage device.

8. The storage array system of claim 7, further comprising:
    a redundant storage device for storing back-up data created from a set of the data sequentially addressed; and
    wherein the reproducing mean regenerates the data from one of the plurality of data storage devices judged to be in need of the preventive maintenance on the spare storage device from the data stored on the remainder of the plurality of data storage devices and the back-up data.

9. A method for controlling a storage array system, comprising the steps of:
    storing data onto a plurality of data storage devices;
    storing a history of self recovered errors of each of the plurality of data storage devices;
    calculating an error rate for a specified interval of each of the plurality of data storage devices based on the history of errors; and
    judging a reliability of operation of each of the plurality of data storage devices from the error rate for the specified interval.

10. The method for controlling a storage array system of claim 9, further comprising the step of:
    detecting a number of errors and an access size of each of the plurality of data storage devices as a part of the history of errors.

11. The method for controlling a storage array system of claim 10, wherein the calculating step includes the step of:
    calculating the error rate by dividing the number of errors by the access size.

12. The method for controlling a storage array system of claim 10, further comprising the steps of:
    determining a total number of errors, a total access size, and an access size when each error is detected, for each of the plurality of data storage devices;
    storing the total number of errors, the total access size, and the access size when each error is detected onto a non-volatile memory; and wherein the calculating step includes the step of calculating the error rate at intervals of predetermined access size from the total number of errors, the total access size, and the access size when each error is detected.

13. The method for controlling a storage array system of claim 12, further comprising the step of:

storing a threshold value of error rate in the non-volatile memory; and wherein the judging step includes the step of judging the reliability of operation of each of the plurality of data storage devices by comparing the calculated error rate and the threshold value of error rate.

14. The method for controlling a storage array system of claim 12, further comprising the steps of:

calculating two inclinations of two error rates of adjacent intervals;

storing a threshold value of inclination of two error rates of adjacent intervals in the non-volatile memory; and wherein the judging step includes the step of judging the reliability of operation of each of the plurality of data storage devices from the threshold value and the inclinations.

15. A method for controlling a storage array system, comprising the steps of:

storing data onto a plurality of data storage devices;

storing a history of self recovered errors of each of the plurality of data storage devices;

calculating an error rate for a specified interval for each one of the plurality of data storage devices based on the history of errors;

judging a necessity to execute a preventive maintenance of each one of the plurality of data storage devices from the error rate for the specified interval; and executing the preventive maintenance.

16. The method for controlling a storage array system of claim 15, wherein the executing step includes the step of:

reproducing data from one of the plurality of data storage devices judged to be in need of the preventive maintenance on a spare storage device which replaces the one of the plurality of data storage devices.

17. The method for controlling a storage array system of claim 16, wherein the data storing step includes the steps of:

dividing the data into a plurality of data blocks;

addressing the plurality of data blocks in sequence;

creating a back-up data block from a set of the data blocks sequentially addressed;

storing the data blocks onto the plurality of data storage devices; and storing the back-up data block onto a redundant storage device.

18. The method for controlling a storage array system of claim 17, wherein the reproducing step includes the steps of:

regenerating, from the data stored on the remainder of the plurality of data storage devices and the redundant data, the data on one of the plurality of data storage devices judged to be in need of the preventive maintenance; and storing the regenerated data onto the spare storage device.

19. The method for controlling a storage array system of claim 16, wherein the executing step includes the step of:

naming, after the reproducing step, the one of the plurality of data storage devices judged to be in need of the preventive maintenance as a new spare storage device for replacing another storage devices.

20. The method for controlling a storage array system of claim 19, wherein the executing step includes the step of:

formatting, between the reproducing step and the naming step, a data structure of the one of the plurality of data storage devices judged to be in need of the preventive maintenance.

21. The method for controlling a storage array system of claim 16, wherein the executing step includes the step of:

naming the one of the plurality of data storage devices judged to be in need of the preventive maintenance as a copy storage device which contains the same data as the spare storage device.

* * * * *

UNITED STATES PATENT AND TRADEMARK OFFICE
CERTIFICATE OF CORRECTION

PATENT NO. : 6,442,711 B1
DATED : August 27, 2002
INVENTOR(S) : Sasamoto et al.

It is certified that error appears in the above-identified patent and that said Letters Patent is hereby corrected as shown below:

<u>Title page,</u>
Item [57], ABSTRACT,
Line 1, after "A" insert -- higher reliable --; and
Line 1, after "system" insert -- that uses error rate and error inclination information to increase reliability --.

<u>Column 8,</u>
Line 1, change "mean" to -- means --.

<u>Column 10,</u>
Line 26, change "devices" to -- device --.

Signed and Sealed this

Tenth Day of December, 2002

JAMES E. ROGAN
*Director of the United States Patent and Trademark Office*